US012525369B2

(12) United States Patent
Karpyuk et al.

(10) Patent No.: US 12,525,369 B2
(45) Date of Patent: Jan. 13, 2026

(54) METHOD FOR PRODUCING PELLETIZED FUEL FROM URANIUM-MOLYBDENUM POWDERS

(71) Applicant: JOINT-STOCK COMPANY "TVEL", Moscow (RU)

(72) Inventors: Leonid Aleksandrovich Karpyuk, Moscow (RU); Aleksandr Vladimirovich Lysikov, Moscow (RU); Evgeniy Nikolaevich Mikheev, Moscow (RU); Denis Sergeevich Missorin, Moscow (RU); Vladimir Vladimirovich Novikov, Moscow (RU); Roman Borisovich Sivov, Moscow (RU); Nikolay Ivanovich Shipunov, Moscow (RU)

(73) Assignee: Joint-Stock Company "TVEL", Moscow (RU)

( * ) Notice: Subject to any disclaimer, the term of this patent is extended or adjusted under 35 U.S.C. 154(b) by 394 days.

(21) Appl. No.: 18/009,788

(22) PCT Filed: Jul. 23, 2020

(86) PCT No.: PCT/RU2020/000390
§ 371 (c)(1),
(2) Date: Dec. 12, 2022

(87) PCT Pub. No.: WO2022/019798
PCT Pub. Date: Jan. 27, 2022

(65) Prior Publication Data
US 2023/0223162 A1      Jul. 13, 2023

(51) Int. Cl.
*G21C 21/02* (2006.01)
*B22F 3/10* (2006.01)
(Continued)

(52) U.S. Cl.
CPC ............ *G21C 21/02* (2013.01); *B22F 3/1007* (2013.01); *B22F 3/1021* (2013.01); *B22F 3/16* (2013.01);
(Continued)

(58) Field of Classification Search
CPC .......... G21C 21/02; G21C 3/045; G21C 3/60; G21C 3/42; B22F 3/1007; B22F 3/1021;
(Continued)

(56) References Cited

U.S. PATENT DOCUMENTS

| 4,985,183 A | 1/1991 | Yato |
| 2013/0336833 A1* | 12/2013 | Allenou ................. B22F 1/00 420/3 |
| 2014/0294135 A1 | 10/2014 | Allenou et al. |

FOREIGN PATENT DOCUMENTS

| CN | 103635272 A | 3/2014 |
| FR | 3012127 B1 | 10/2016 |

(Continued)

OTHER PUBLICATIONS

RU-2275700-C2 translation (Year: 2006).*
(Continued)

*Primary Examiner* — Ricardo D Morales
(74) *Attorney, Agent, or Firm* — Dentons US LLP

(57) ABSTRACT

The invention relates to the nuclear industry and can be used for producing fuel pellets from uranium-molybdenum metal powders enriched to 7% uranium 235 for nuclear reactor fuel elements. The pellets are sintered in an inert atmosphere of argon at a temperature ranging from 1100° C. to 1155° C., and the initial powder is a uranium-molybdenum powder having a fraction size of 160 μm and a molybdenum content of 9.0 to 10.5 wt %. The powder is pre-heated at a temperature of 500° C. for 10-20 hours (in an atmosphere of argon) and is subsequently cold pressed into pellets in a die (Continued)

under a force of up to 950 MPa. In an alternative embodiment for producing uranium-molybdenum pellets with a binder (plasticizer), the step of sintering is preceded by heating the pellets in an atmosphere of argon at 300° C. to 450° C. for 2-4 hours to remove the binder. The invention makes it possible to increase the uranium intensity of the fuel, reduce the amount of heat buildup in a reactor core, and lower the amount of energy released in the event of abnormalities in the operation of a nuclear reactor, thus providing increased reactor safety and resilience to accidents.

9 Claims, 1 Drawing Sheet

(51) Int. Cl.
  *B22F 3/16* (2006.01)
  *G21C 3/04* (2006.01)
  *G21C 3/60* (2006.01)
(52) U.S. Cl.
  CPC ............... *G21C 3/045* (2019.01); *G21C 3/60* (2013.01); *B22F 2201/11* (2013.01); *B22F 2301/20* (2013.01)

(58) Field of Classification Search
  CPC .... B22F 3/16; B22F 2201/11; B22F 2301/20; Y02E 30/30; Y10S 376/901
  See application file for complete search history.

(56) References Cited

FOREIGN PATENT DOCUMENTS

| | | |
|---|---|---|
| FR | 3012127 | 4/2024 |
| RU | 2275700 C2 * | 4/2006 |
| RU | 2360308 C1 | 6/2009 |
| RU | 2421834 C1 | 6/2011 |

OTHER PUBLICATIONS

International Search Report dated Feb. 18, 2021 for International Application PCT/RU2020/000390 filed Jul. 23, 2020 (2 pages).
Brown et al., Elastic properties of rolled uranium-10wt.% molybdenum nuclear fuel foils, Scripta Materialia, vol. 69, No. 9, 2013, pp. 666-669.
Eiss et al., Dimensionally stable alloys, Sylvania-Corning Nuclear Corp., Bayside, NY, Oct. 30, 1957 (49 pages).
Europe Search Report dated May 22, 2023 for Application 20946431.2 filed Jul. 23, 2020 (4 pages).

* cited by examiner

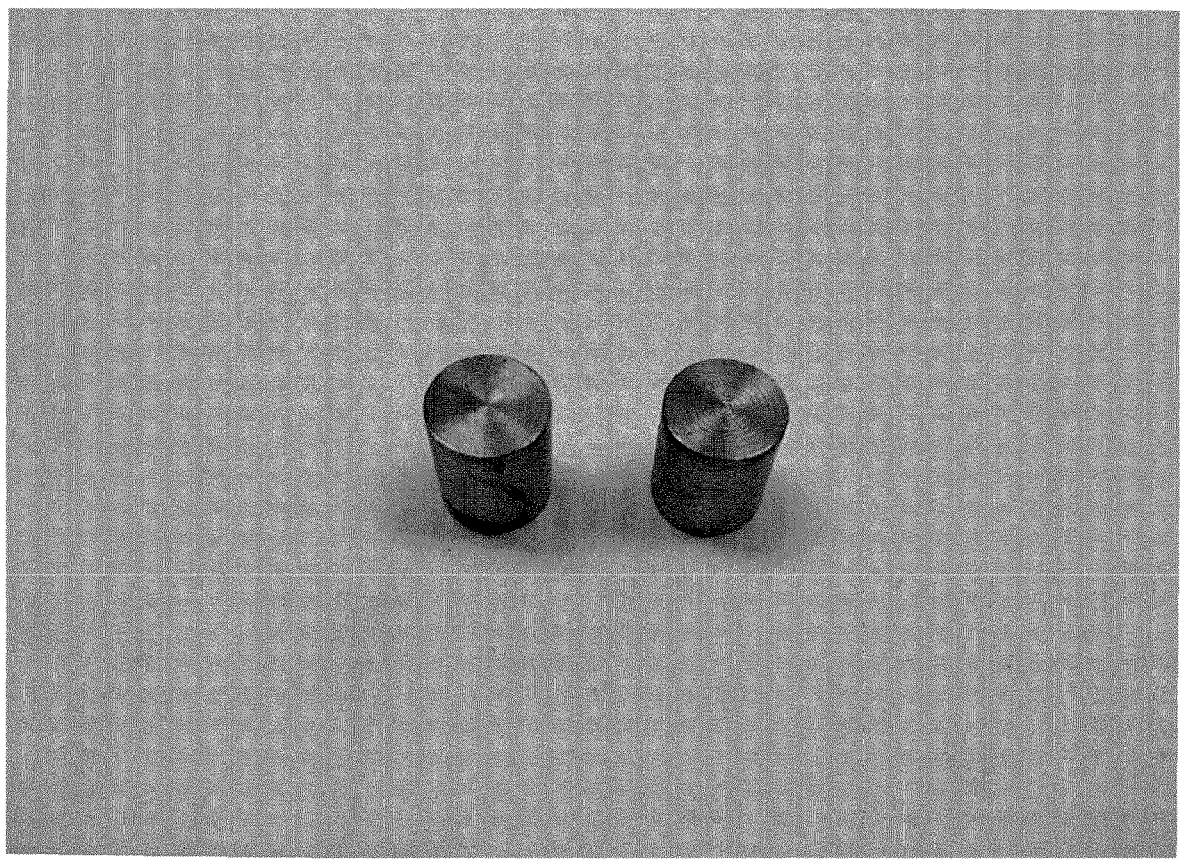

METHOD FOR PRODUCING PELLETIZED FUEL FROM URANIUM-MOLYBDENUM POWDERS

CROSS-REFERENCE TO RELATED PATENT APPLICATION

This patent application claims a benefit of priority to PCT International Application PCT/RU2020/000390 filed 23 Jul. 2020; which is herein incorporated by reference in its entirety for all purposes.

FIELD OF THE INVENTION

The invention relates to the nuclear industry and can be used for producing fuel pellets from uranium-molybdenum metal powders enriched to 7% uranium 235 for nuclear reactor fuel elements.

BACKGROUND OF THE INVENTION

A well-known standard technology for producing fuel pellets in the production of ceramic nuclear fuel from uranium dioxide (enriched up to 5% uranium 235) includes: obtaining and preparing uranium dioxide press-powder (mixed with a binder), pressing into pellets in a die, sintering pellets in a gaseous atmosphere, dry or wet grinding of pellets, drying, and checking pellets for compliance with specifications and drawing, packaging of satisfactory product, transferring them to filling of fuel elements of nuclear reactors (Design, Manufacture and Operation of Fuel Elements of Power Reactors. Edited by F. G. Reshetnikov-Moscow: Energoatomizdat, 1995, Book 1, pp. 93-106).

A method for obtaining uranium-molybdenum alloy U-9% Mo by cold pressing followed by sintering is known [Eiss A. L. Kalish H. S. $3^{rd}$ Nucl. Eng. And Sci. Conference, USA, Paper 178, 1958]. In this method, uranium and molybdenum powders were mixed for 2 hours without adding a binder. After mixing the powders of uranium and molybdenum, they were pressed to obtain briquettes ~4.5 cm long and with 1.9×1.9 cm square cross-section, and cylinder-shaped briquettes. The sintering was performed for 4 hours in vacuum at 1150° C. Metallographic testing of the cold-pressed and sintered samples showed that the alloyed elements fully react with each other. The density of resulting pellets was 17.18 g/cm$^3$.

The disadvantage of this method is that there is an uneven distribution of molybdenum throughout the volume and the need to create high pressure during cold pressing of mixed powders of uranium and molybdenum in the samples obtained this way.

A method for producing ceramic fuel pellets for nuclear reactor fuel elements is also known comprising preparation of uranium dioxide powder mixed with a binder, pressing into pellets in two stages and sintering them (see Russian patent No. 2421834, IPC G21C 3/02, BI No. 17 dated 20 Jun. 2011).

The disadvantage of this method is a two-stage pressing of uranium dioxide pellets and the use of a plasticizer in the preparation of the press-powder.

The closest is a method for producing ceramic fuel pellets for fuel elements of a nuclear reactor (Russian patent No. 2360308 IPC G21C 3/62, BI No. 18 dated 27 Jun. 2009) comprising preparation of uranium dioxide press-powder enriched to 1.6-5% uranium 235, stage-by-stage mixing with a dry binder (metal-free) and uranium oxide powder, pressing into pellets in a die, thermal removal of the binder, sintering of pellets in a gaseous reducing atmosphere, wet grinding of pellets with a diamond disk, drying, and rejection of pellets.

The disadvantage of the method is that the method requires significant power consumption during pressing, and the resulting fuel has smaller uranium intensity.

SUMMARY OF THE INVENTION

The objective of the invention is to develop a method for producing pelletized fuel from uranium-molybdenum alloys enriched to 7% uranium 235 for nuclear reactor fuel elements, which increases the safety of nuclear reactor operating conditions and performance.

The technical result of the proposed invention according to the first and second embodiment is aimed to obtain uranium-molybdenum pellets enriched to 7% uranium 235 for fuel elements of a nuclear reactor, which increases the uranium intensity of the fuel, reduces the amount of heat buildup in a reactor core, and lowers the amount of energy released in the event of abnormalities in the operation of a nuclear reactor, thus providing increased reactor safety and resilience to accidents.

The technical result according to the first embodiment is achieved in a method for producing pelletized fuel from uranium-molybdenum powders for fuel elements of a nuclear reactor, comprising powder preparation, pressing into pellets in a die, sintering in a gaseous atmosphere, grinding, drying, and rejection of pellets. The pellets are sintered in an inert atmosphere, and uranium-molybdenum powder with uranium 235 enrichment to 7% and molybdenum content of 9.0 to 10.5 wt % is used as an initial powder.

Uranium-molybdenum powder fraction size is no more than 160 μm. Before pressing into the pellets in the die, the uranium-molybdenum powder is heated in argon at 500° C. for 10-20 hours. The pellets are pressed in the die with a force of up to 950 MPa. The pellets are sintered in argon at 1100° C.-1155° C. for 4-12 hours.

The technical result according to the second embodiment is achieved in a method for producing pelletized fuel from uranium-molybdenum powders for nuclear reactor fuel elements, comprising powder preparation, stage-by-stage mixing with a binder, pressing into pellets in a die, thermal removal of the binder, sintering the pellets in a gaseous atmosphere, grinding, drying, rejection of pellets. The pellets are sintered in an inert atmosphere, and uranium-molybdenum powder with uranium 235 enrichment to 7% and with molybdenum content of 9.0 to 10.5 wt % is used as an initial powder. Uranium-molybdenum powder fraction size is no more than 160 μm. The pellets are pressed in the die with a force of up to 950 MPa. The thermal removal of the binder is done by heating the pellets in argon at 300° C. to 450° C. for 2-4 hours.

The pellets are sintered in argon at 1100° C.-1155° C. for 4-12 hours.

This technology for producing pelletized fuel from uranium-molybdenum metal powders for nuclear reactor fuel elements helps obtain uranium-molybdenum pellets with uranium 235 enrichment up to 7%, molybdenum content from 9.0 to 10.5 wt %, and the pellet density at least 15.7 g/cm$^3$ (over 90% of the theoretical density). The performance of a nuclear reactor fueled with uranium-molybdenum pellets increases due to the increased thermal conductivity of uranium-molybdenum fuel compared to the existing uranium dioxide fuel and the use of lower uranium 235 enrichment, since the density of uranium-molybdenum pellets is 1.5 times higher than that of uranium dioxide pellets.

Higher nuclear reactor fueling in terms of uranium mass due to the higher density of uranium-molybdenum alloy (9.0 to 10.5 wt %) compared to the density of uranium dioxide expends the fuel cycle time in the reactor without the need to increase fuel enrichment. The density of uranium dioxide by uranium is 9.7 g/cm$^3$, and the density of uranium-molybdenum alloy (9.0 to 10.5 wt %) by uranium is ~15.75 g/cm$^3$. Thus, with the same charge of uranium-molybdenum fuel in the reactor, the amount of fissile component increases and is ~60%.

It is known [V. V. Kalashnikov, V. V. Titov, G. Ya. Sergeev, A. G. Samoilov. Uranium-Molybdenum Alloys in Reactor Engineering, Atomic Energy Journal, Volume 5, Issue 4, October 1958, p. 422] that during tempering of U-Mo γ-alloy within the temperature range of 350-550° C., γ-phase converts into a eutectoidal mixture of α-uranium and U$_2$Mo intermetallide (γ'-phase). However, this process runs slowly. When the initial powder is held in vacuum for 10-20 hours at 500° C., the phases get partially separated to produce γ-phase, a eutectoid mixture of α-phase and γ'-phase. The use of powder, which is a eutectoidal mixture of phases, helps obtain strong "raw" pellets at lower pressing forces (up to 950 MPa). Further sintering of such pressings (pellets) at temperatures above 1100° C. is accompanied by a complete reverse transition of the eutectoid to the γ-state.

The optimum result is achieved when the initial metal powder of uranium-molybdenum with molybdenum content of 9.0 to 10.5 wt % is held in an inert gas at a temperature of 500° C. for 10 to 20 hours, due to the fact that the initial metal powder of uranium-molybdenum in the form of γ-phase is subjected to partial separation of phases to γ-phase, eutectoidal mixture of α-phase and γ'-phase; all this helps obtain strong "raw" pellets at pressing forces of up to 950 MPa.

Lower molybdenum content in the initial uranium-molybdenum powder less than 9.0 wt % leads to an increased density of sintered uranium-molybdenum pellets (up to 19.05 g/cm$^3$ with zero molybdenum content), and higher molybdenum content in the initial uranium-molybdenum powder over 10.5 wt % leads to a decreased density of pellets, which is not allowed by technical requirements for the production of pellets for nuclear reactors.

Increasing the sintering temperature above 1155° C. leads to melting of the uranium-molybdenum pellet, and temperatures below 1100° C. make it impossible to obtain a pellet without internal pores. However, the pellet density remains low and is only 13-14 g/cm$^3$.

The best results were achieved with uranium-molybdenum pellets with molybdenum content of 9.0 to 10.5 wt % at a sintering temperature (in an inert gas) of 1100° C. to 1155° C. for 4 to 12 hours.

The developed method helps obtain γ-phase from uranium-molybdenum powders for nuclear reactor fuel elements, with molybdenum being the basic alloying element that contributes to the preservation of uranium γ-phase throughout the operating temperature range of a fuel element. Molybdenum not only modifies the kinetics of phase transformations to produce a randomly oriented fine-grained structure, but also stabilizes uranium γ-phase, thereby increasing fuel element performance.

Due to the fact that the thermal conductivity of uranium-molybdenum fuel is higher than that of uranium dioxide fuel, the amount of heat buildup in a reactor core can be reduced, and the amount of energy released in the event of abnormalities in the operation of a nuclear reactor can be reduced, thus providing increased reactor safety and resilience to accidents.

DETAILED DESCRIPTION OF THE INVENTION

Provided below are examples of embodiment of the proposed uranium-molybdenum pellet production method.

Example 1 (according to the first embodiment). A uranium-molybdenum powder with molybdenum content in the alloy of 9.0 wt % obtained by centrifugal atomization from an ingot of the same alloy, with uranium 235 enrichment to 7%, is used as an initial powder. Centrifugal atomization of an uranium-molybdenum ingot with molybdenum content in the alloy of 9.0 wt % helps obtain a uniform molybdenum content in the initial powder. The powder is screened through a 160 μm sieve. The screened uranium-molybdenum powder with a molybdenum content of 9.0 wt % is heated at 500° C. for 20 hours in a top-loader vacuum furnace SShVE (in argon). The resulting powder is pressed in a cylindrical die at a molding pressure of 750 MPa without adding a binder (plasticizer). The pellets are sintered in argon (with water content not exceeding 80 ppm) at $(1125^{+10/-5})°$ C. at an isothermal exposure time of 4 hours in an SShVE furnace (or XERION XVAC-2200). Heating to isothermal exposure is carried out in a stream of argon 1 l/min at a heating rate not exceeding 5° C./min, followed by cooling in static argon at a cooling rate of (15-20)° C.)/min. After that, pellets are ground, dried, and rejected for compliance with technical requirements.

Example 2 (according to the first embodiment). A uranium-molybdenum powder with molybdenum content in the alloy of 10.5 wt % obtained by centrifugal atomization from an ingot of the same alloy, with uranium 235 enrichment to 7%, is used as an initial powder. Centrifugal atomization of an uranium-molybdenum ingot with molybdenum content in the alloy of 10.5 wt % helps obtain a uniform molybdenum content in the initial powder. The powder is screened through a 160 μm sieve. The screened uranium-molybdenum powder with a molybdenum content of 10.25 wt % is heated at 500° C. for 10 hours in a top-loader vacuum furnace SShVE (in argon). The resulting powder is pressed in a cylindrical die at a molding pressure of 950 MPa without adding a binder (plasticizer). The pellets are sintered in argon (with water content not exceeding 80 ppm) at $(1125^{+10/-5})°$ C. at an isothermal exposure time of 12 hours in an SShVE furnace (or XERION XVAC-2200). Heating to isothermal exposure is carried out in a stream of argon 1 l/min at a heating rate not exceeding 5° C./min. followed by cooling in static argon at a cooling rate of (15-20° C.)/min. After that, pellets are ground, dried, and rejected for compliance with technical requirements.

Example 3 (according to the second embodiment). A uranium-molybdenum powder with molybdenum content in the alloy of 9.0 wt % obtained by centrifugal atomization from an ingot of the same alloy, with uranium 235 enrichment to 7% and screened through a 160 μm sieve, is used as an initial powder. Centrifugal atomization of an uranium-molybdenum ingot with molybdenum content in the alloy of 9.0 wt % helps obtain a uniform molybdenum content in the initial powder. 8% aqueous solution of polyvinyl alcohol with 1% glycerol (3% by weight of the uranium-molybdenum alloy) is used as a plasticizer (binder). Mixing includes three stages. At the first stage, the entire amount of the binder and uranium-molybdenum alloy powder in an amount up to 10 wt % are mixed to get a homogeneous mixture. At the second stage, the resulting mixture is mixed with up to 40 wt % uranium-molybdenum alloy powder to get a homogeneous mixture. At the third stage, the remaining amount of uranium-molybdenum alloy powder is added into the mixture obtained at the second stage and mixed to get a homogeneous mixture. The powder is mixed in a Turbula mixer for 20-30 minutes. The prepared powder is pressed in a cylindrical die at a molding pressure of 850 MPa. Before sintering, the pellets are heated in argon at 300° C. to 450° C. for 4 hours to remove the binder. The pellets are sintered in argon (with water content not exceeding 80 ppm) at $(1125^{+10/-5})°$ C. at an isothermal exposure time of about 4 hours in a top-loader furnace SShVE. Heating to isothermal exposure is carried out in a stream of argon 1 l/min at a heating rate not exceeding 5° C./min. followed by cooling in static argon at a cooling rate of (15-20° C.)/min. After that, pellets are ground, dried, and rejected for compliance with technical requirements.

Example 4 (according to the second embodiment). A uranium-molybdenum powder with molybdenum content in the alloy of 10.5 wt % obtained by centrifugal atomization from an ingot of the same alloy, with uranium 235 enrichment to 7% and screened through a 160 μm sieve, is used as an initial powder. Centrifugal atomization of an uranium-molybdenum ingot with molybdenum content in the alloy of 10.5 wt % helps obtain a uniform molybdenum content in the initial powder. 8% aqueous solution of polyvinyl alcohol with 1% glycerol (3% by weight of the uranium-molybdenum alloy) is used as a plasticizer (binder). Mixing includes three stages. At the first stage, the entire amount of the binder and uranium-molybdenum alloy powder in an amount up to 10 wt % are mixed to get a homogeneous mixture. At the second stage, the resulting mixture is mixed with up to 40 wt % uranium-molybdenum alloy powder to get a homogeneous mixture. At the third stage, the remaining amount of uranium-molybdenum alloy powder is added into the mixture obtained at the second stage and mixed to get a homogeneous mixture. The powder is mixed in a Turbula mixer for 20-30 minutes. The prepared powder is pressed in a cylindrical die at a molding pressure of 950 MPa. Before sintering, the pellets are heated in argon at 300° C. to 450° C. for 2 hours to remove the binder. The pellets are sintered in argon (with water content not exceeding 80 ppm) at $(1125^{+10/-5})°$ C. at an isothermal exposure time of about 12 hours in a top-loader furnace SShVE. Heating to isothermal exposure is carried out in a stream of argon 1 l/min at a heating rate not exceeding 5° C./min, followed by cooling in static argon at a cooling rate of (15-20° C.)/min. After that, pellets are ground, dried, and rejected for compliance with technical requirements.

FIG. 1 shows uranium-molybdenum pellets after sintering and machining.

Thus, the proposed method, compared with the known ones, helps obtain fuel pellets from uranium-molybdenum powders with uranium 235 enrichment to 7% and molybdenum content from 9.0 to 10.5 wt % for nuclear reactor fuel elements with improved performance.

The invention claimed is:

1. A method for producing pelletized fuel from uranium-molybdenum powders for fuel elements of a nuclear reactor, comprising preparation of powder, pressing into pellets in a die, sintering them in a gaseous atmosphere, grinding, drying, rejection of the pellets, characterized in that, prior to pressing into the pellets in the die, the uranium-molybdenum powder is heated in argon at 500° C. for 10-20 hours, the pellets are sintered in an inert atmosphere, and uranium-molybdenum powder with uranium 235 enrichment to 7% and molybdenum content of 9.0 to 10.5 wt % is used as an initial powder.

2. The method according to claim 1, characterized in that the uranium-molybdenum powder fraction size does not exceed 160 μm.

3. The method according to claim 1, characterized in that a force of up to 950 MPa is applied to press the pellets in the die.

4. The method according to claim 1, characterized in that the pellets are sintered in an atmosphere of argon at a temperature in a range of more than 1100° C., but less than or equal to 1155° C. for 4-12 hours.

5. A method for producing pelletized fuel from uranium-molybdenum powders for nuclear reactor fuel elements, comprising preparation of powder, stage-by-stage mixing with a binder, pressing into pellets in a die, thermal removal of the binder, sintering the pellets in a gaseous atmosphere, grinding, drying, rejection of the pellets, characterized in that the pellets are sintered in an inert atmosphere, and uranium-molybdenum powder with uranium 235 enrichment to 7% and with molybdenum content of 9.0 to 10.5 wt % is used as an initial powder, wherein a 8% aqueous solution of polyvinyl alcohol with 1% glycerol in an amount of 3% by weight of the uranium-molybdenum alloy is used as the binder.

6. The method according to claim 5, characterized in that the uranium-molybdenum powder fraction size does not exceed 160 μm.

7. The method according to claim 5, characterized in that a force of up to 950 MPa is applied to press into the pellets in the die.

8. The method according to claim 5, characterized in that the thermal removal of the binder is done by heating the pellets in an atmosphere of argon at from 300° C. to 450° C. for 2-4 hours.

9. The method according to claim 5, characterized in that the pellets are sintered in an atmosphere of argon at a temperature in a range of more than 1100° C., but less than or equal to 1155° C. for 4-12 hours.

\* \* \* \* \*